(12) United States Patent
Kim et al.

(10) Patent No.: US 11,375,171 B2
(45) Date of Patent: Jun. 28, 2022

(54) SYSTEM AND METHOD FOR PRELOADING MULTI-VIEW VIDEO

(71) Applicant: Fdn. for Res.&Bus., Seoul Nat. Univ. of Sci.&Tech., Seoul (KR)

(72) Inventors: Dong Ho Kim, Seoul (KR); Bong-Seok Seo, Gyeonggi-do (KR)

(73) Assignee: FDN. FOR RES.&BUS., SEOUL NAT. UNIV. OF SCI.&TECH., Seoul (KR)

(*) Notice: Subject to any disclaimer, the term of this patent is extended or adjusted under 35 U.S.C. 154(b) by 152 days.

(21) Appl. No.: 16/705,869

(22) Filed: Dec. 6, 2019

(65) Prior Publication Data

US 2021/0160474 A1 May 27, 2021

(30) Foreign Application Priority Data

Nov. 26, 2019 (KR) .................. 10-2019-0152852

(51) Int. Cl.
| | |
|---|---|
| *H04N 13/194* | (2018.01) |
| *G06T 7/00* | (2017.01) |
| *H04N 13/383* | (2018.01) |
| *G06T 3/40* | (2006.01) |
| *H04L 67/02* | (2022.01) |

(Continued)

(52) U.S. Cl.
CPC ......... *H04N 13/194* (2018.05); *G06T 3/4092* (2013.01); *G06T 7/97* (2017.01); *H04L 67/02* (2013.01); *H04L 67/2847* (2013.01); *H04L 67/38* (2013.01); *H04N 13/383* (2018.05); *H04N 21/20* (2013.01); *H04N 21/21805* (2013.01); *H04N 21/23* (2013.01); *H04N 21/234* (2013.01); *H04N 21/235* (2013.01); *H04N 21/43* (2013.01); *H04N 21/438* (2013.01)

(58) Field of Classification Search
CPC .... H04N 13/194; H04N 13/383; H04N 21/20; H04N 21/21805; H04N 21/23; H04N 21/234; H04N 21/235; H04N 21/43; H04N 21/438; H04N 21/23614; H04N 21/8456; G06T 7/97; G06T 3/4092; H04L 67/02; H04L 67/2847; H04L 67/38
See application file for complete search history.

(56) References Cited

U.S. PATENT DOCUMENTS

2020/0059635 A1* 2/2020 Katsumata ........... H04N 13/111

FOREIGN PATENT DOCUMENTS

| KR | 10-2019-0045934 | 5/2019 |
|---|---|---|
| WO | WO 2018046797 | 3/2018 |

OTHER PUBLICATIONS

IEEE International Conference On Image Processing (ICIP) (Year: 2017).*

(Continued)

*Primary Examiner* — Anthony Bantamoi
(74) *Attorney, Agent, or Firm* — HoustonHogle LLP

(57) ABSTRACT

The present invention relates to a system and a method of preloading a multi-view video. According to an embodiment of the present invention, load of a system is reduced and client's Quality of Experience (QoE) is maximized. In addition, the sense of direction, distance, and space for virtual reality are felt in the same manner as those for the real environment, so that a virtual reality service is provided realistically, thereby further improving immersion and interest in the virtual reality service.

16 Claims, 5 Drawing Sheets

(51) Int. Cl.
*H04L 67/5681* (2022.01)
*H04L 67/131* (2022.01)
*H04N 21/20* (2011.01)
*H04N 21/218* (2011.01)
*H04N 21/23* (2011.01)
*H04N 21/234* (2011.01)
*H04N 21/235* (2011.01)
*H04N 21/43* (2011.01)
*H04N 21/438* (2011.01)

(56) References Cited

OTHER PUBLICATIONS

Jung, S.M., "Based on DASH Segment Preload—A Study on the Method of Providing Multi-View Images in Virtual Space," Graduate School of Nano IT Design Convergence, Seoul National University of Science, 1-123 (2019).

* cited by examiner

```
<Period>
<AdaptationSet>
<SupplementalProperty SchemeIdUri="urn:mpeg:dash:6dof:2019"
Rank="1" Vector="0.7,0.6">
<Role schmemIdUri="urn:mpeg:dash:role:2011" value="main"
<Representation id="1" width="3840" height="2160" ....>
<BaseURL>A.mp4
</BaseURL>
</Representation>
</AdaptationSet>
<AdaptationSet>
<SupplementalProperty SchemeIdUri="urn:mpeg:dash:6dof:2019"
Rank="2" Vector="0.3,0.9">
<Role schmemIdUri="urn:mpeg:dash:role:2011" value="supplementary"
<Representation id="2" width="3840" height="2160" ....>
<BaseURL>B.mp4
</BaseURL>
</Representation>
</AdaptationSet>
```

FIG. 5

SYSTEM AND METHOD FOR PRELOADING MULTI-VIEW VIDEO

CROSS REFERENCE TO RELATED APPLICATION

The present application claims priority to Korean Patent Application No. 10-2019-0152852, filed Nov. 26, 2019, the entire contents of which is incorporated herein for all purposes by this reference.

BACKGROUND OF THE INVENTION

Field of the Invention

The present invention relates to a system and a method for preloading a multi-view video. More particularly, the present invention relates to a technology, where distance information and direction information, the distance being the difference in positions of viewpoints between a video of a current viewpoint of a content acquired through multiple cameras and a video similar thereto, are recorded in an MPD for transmission, and by using the distance information and the direction information in the received MPD, the video having the information on the minimum distance and direction is preloaded to a remaining band.

Description of the Related Art

Recently, with development of devices such as smartphones, etc., simultaneously, a social interest in a virtual reality technology (VR technology) has been increased. The VR technology is a technology that enables overcoming the difference between reality and virtual systems by increasing the fidelity of representation of a simulated entity, and is one of technologies that have recently attracted attention, as a technology to overcome the limit of the conventional technology.

A voice and a video stream of a 360 VR content are transmitted over a network in the form of DASH MPD. That is, the DASH is an adaptive bit rate streaming technique that enables media data streaming from web servers using a Hypertext Transport Protocol (HTTP) technique, over the Internet.

Herein, a media presentation description (MPD) provides an adaptation set for the voice and the video stream within a period, and a description set for each resolution within the adaptation set. After division into second-based segments in each provided adaptation set and description set, the MPD is stored in the HTTP server.

In the meantime, regarding a tile, one frame of a video is spatially divided, and coding is performed for each tile through High Efficiency Video Codec (HEVC). The tiles are transmitted with different resolutions.

Accordingly, a DASH client 20 parses the media presentation description (MPD) provided from an HTTP engine. When the DASH client requests the content, the HTTP server provides the lowest-resolution segment, and then adaptively provides the segments according to a network condition and a parameter.

However, various contents, and interaction and activity between clients have been requested. Therefore, a video standards institution has developed and consulted a technology for contents including a multi-view video having 3DoF or more.

However, downloading the MPD including all the information on each viewpoint consumes the bandwidth a lot in a limited wireless channel.

That is, in the case of 360 video playing for each viewpoint, several play devices for representing movement of the viewpoint need to be arranged so as to play one viewpoint specified by a client, or one client needs to have all the videos of several viewpoints in a buffer, resulting in an increase in load of a system.

Accordingly, the present applicant intends to propose a scheme where information on a distance, which is the difference in position between the video of the current viewpoint and the video of the viewpoint to move, and direction information are stored in an MPD and a resulting MPD is transmitted over a network; and by using the distance information and the direction information in the received MPD, a spare band is allocated to preload the video of the viewpoint having the information on the distance closest to the video of the current viewpoint, whereby load of a system is reduced and client's Quality of Experience is maximized.

SUMMARY OF THE INVENTION

The present invention provides a system and a method for preloading a multi-view video, the system and the method being capable of reducing a load of a system and maximizing client's Quality Of Experience, in producing and playing content with three degrees of freedom (3DoF) or more.

The present invention provides a system and a method for preloading a multi-view video, the system and the method being capable of enhancing immersion and interest in a virtual reality service provided according to the present invention.

The objectives of the present invention are not limited thereto, and the other objectives and advantages of the present invention which are not described will be understood from the following description and become apparent by the embodiments of the present invention. In addition, it is understood that the objectives and advantages of the present invention may be implemented by components defined in the appended claims or their combinations.

In order to achieve the above objectives, according to one aspect, there is provided a system for preloading a multi-view video, the system including:

a content production unit generating media data in which the video in a form of equirectangular projection (ERP) acquired through multiple cameras is spatially divided and encoded; and an HTTP server receiving the media data; dividing the media data into predetermined-time-based segments; generating an MPD for each of the segments resulting from the division; adding, to the generated MPD, distance information and direction information, the distance being a difference in positions of viewpoints between the video of a current viewpoint and the video similar thereto; and transmitting a resulting MPD and a segment tile to a client device over a network The HTTP may include:

a distance information derivation module deriving the distance information on the basis of the position of the video of the current viewpoint, the distance being between the positions of the viewpoints in the video of the current viewpoint and the videos similar thereto;

a direction information derivation module deriving, in a form of a vector, movement direction information of the viewpoints in the video of the current viewpoint and the videos similar thereto, on the basis of the position of the current viewpoint; and an MPD generation module adding, into the MPD for each of an audio and a video stream of a frame within one period, the distance information and the movement direction information of the viewpoint for a region of interesting (ROI) of a user within the frame.

The distance information derivation module may be configured to derive, on the basis of the position of the video of the current viewpoint, the difference in the positions of the viewpoints between the video of the current viewpoint and the videos similar thereto, and provide the distance information RANK 1 to RANK N for respective groups of the viewpoints belonging to at least one predetermined range in which the derived difference between the position of the viewpoint of each of the videos similar to the video of the current viewpoint and the position of the current viewpoint is predetermined.

The distance information may be configured so that one piece of the distance information RANK 1 to RANK N is provided to the group of the viewpoints belonging to the one predetermined range.

The MPD generation module may include an adaptation set and a description set included in the adaptation set, may determine, in SupplymentalProperty information, SchemeID as 6dof:2019, and may record the distance information and the direction information in a lower level.

According to another aspect, there is provided a system for preloading a multi-view video, the system including:

a client device receiving segments and an MPD for each of the segments from an HTTP server; parsing the MPD; dividing the received segments into second-based segments; and predicting a position of a viewpoint of a user on the basis of the MPD, wherein the client device is configured to perform, from distance information and movement direction information in the MPD for the segment of the predicted viewpoint of the user, preloading for playing in order, starting from the video of the viewpoint in which a size of a vector of the movement direction information is the smallest among the viewpoints in a group corresponding to the information on the minimum distance.

The client device may include:

an MPD parser receiving the segments and the MPD for each of the segments from the HTTP server; parsing the MPD; and predicting the position of the viewpoint of the user on the basis of the MPD;

a processor determining, from the distance information and the movement direction information in the MPD for the predicted viewpoint of the user, whether the video of the predicted viewpoint of the user is the same as the video of the viewpoint in which the size of the vector of the movement direction information is the smallest among the viewpoints in the group corresponding to the information on the minimum distance; and transmitting, to the HTTP server when similarity between the videos is high as a result of the determination, a request for the segment of the video of the viewpoint in which the size of the vector of the movement direction information is the smallest among the viewpoints in the group corresponding to the distance information; and a VR engine preloading a response to the request for the segment which is from the HTTP server, to a remaining band and then performing playing.

According to still another aspect, there is provided a method for preloading a multi-view video, the method including:

(a) receiving, by an HTTP server, media data in which the video in a form of equirectangular projection (ERP) acquired through multiple cameras is spatially divided and encoded, and dividing the media data into predetermined-time-based segments; and (b) generating an MPD for each of the segments resulting from the division; adding, to the generated MPD, distance information and direction information, the distance being between viewpoints in the video of a current viewpoint and the video similar thereto; and transmitting a resulting MPD and a segment tile to a client device over a network.

Herein, the step (a) may include: deriving, at a distance information derivation step, the distance information on the basis of a position of the video of the current viewpoint, the distance being a difference in the positions of the viewpoints between the video of the current viewpoint and the videos similar thereto;

deriving, in a form of a vector at a direction information derivation step, movement direction information of the viewpoints in the video of the current viewpoint and the videos similar thereto, on the basis of the position of the current viewpoint; and adding, at an MPD generation step, into the MPD for each of an audio and a video stream of a frame within one period, the distance information and the movement direction information of the viewpoint for a region of interesting (ROI) of a user within the frame.

The distance information derivation step may include:

deriving, on the basis of the position of the video of the current viewpoint, the difference in the positions of the viewpoints between the video of the current viewpoint and the videos similar thereto; and providing the distance information RANK 1 to RANK N for respective groups of the viewpoints belonging to at least one predetermined range in which the derived difference between the position of the viewpoint of each of the videos similar to the video of the current viewpoint and the position of the current viewpoint is predetermined.

The distance information may be configured so that one piece of the distance information RANK 1 to RANK N is provided to the group of the viewpoints belonging to the one predetermined range.

At the MPD generation step, an adaptation set and a description set may be included in the adaptation set are included; in SupplymentalProperty information, SchemeID may be determined as 6dof:2019; and the distance information and the direction information may be recorded in a lower level.

According to still another aspect, there is provided a method for preloading a multi-view video, the method including:

(c) receiving segments and an MPD for each of the segments from an HTTP server; and parsing the MPD;

(d) dividing the received segments into second-based segments; and predicting a position of a viewpoint of a user on the basis of the MPD; and (e) performing, from distance information and movement direction information in the MPD for the segment of the predicted viewpoint of the user, preloading for playing in order, starting from the video of the viewpoint in which a size of a vector of the movement direction information is the smallest among the viewpoints in a group corresponding to the information on the minimum distance.

The step (e) may include:

receiving the segments and the MPD for each of the segments from the HTTP server, parsing the MPD, and predicting the position of the viewpoint of the user on the basis of the MPD;

determining, from the distance information and the movement direction information in the MPD for the predicted viewpoint of the user, whether the video of the predicted viewpoint of the user is the same as the video of the viewpoint in which the size of the vector of the movement direction information is the smallest among the viewpoints in the group corresponding to the information on the minimum distance;

transmitting, to the HTTP server, when similarity between the videos is high as a result of the determination, a request for the segment of the video of the viewpoint in which the size of the vector of the movement direction information is the smallest among the viewpoints in the group corresponding to the distance information; and preloading a response to the request for the segment which is from the HTTP server, to a remaining band, and performing playing.

According to yet still another aspect, there is provided a method for preloading a multi-view video, the method including:

(a) receiving, by an HTTP server, media data in which the video in a form of equirectangular projection (ERP) acquired through multiple cameras is spatially divided and encoded, and dividing the media data into predetermined-time-based segments;

(b) generating an MPD for each of the segments resulting from the division; adding, to the generated MPD, distance information and direction information, the distance being between viewpoints in the video of a current viewpoint and the video similar thereto; and transmitting a resulting MPD and a segment tile to a client device over a network; and (c) receiving, by a client device, the segments and the MPD for each of the segments from the HTTP server; parsing the MPD; dividing the received segments into second-based segments; predicting a position of the viewpoint of a user on the basis of the MPD; and performing, from the distance information and movement direction information in the MPD for the segment of the predicted viewpoint of the user, preloading for playing in order, starting from the video of the viewpoint in which a size of a vector of the direction information is the smallest among the viewpoints in a group corresponding to the information on the minimum distance.

According to an embodiment, information on the distance, which is the difference in position between the video of the current viewpoint and the video of the viewpoint to move, and the direction information are stored in the MPD and a result thereof is transmitted over the network; and by using the distance information and the direction information in the received MPD, the remaining band is allocated to preload the video of the viewpoint having the information on the distance closest to the video of the current viewpoint, whereby load of a system is reduced and client's Quality of Experience (QoE) is maximized.

According to the present invention, the sense of direction, distance, and space for virtual reality are felt in the same manner as those for the real environment, so that a virtual reality service is provided realistically, thereby further improving immersion and interest in the virtual reality service.

BRIEF DESCRIPTION OF THE DRAWINGS

The accompanying drawings illustrate a preferred embodiment of the present invention and together with the foregoing disclosure, serve to provide further understanding of the technical features of the present invention, and thus, the present invention is not construed as being limited to the drawings, in which:

FIG. 5 is a diagram illustrating an example of an MPD structure according to an embodiment.

DETAILED DESCRIPTION OF THE INVENTION

Figure 1:
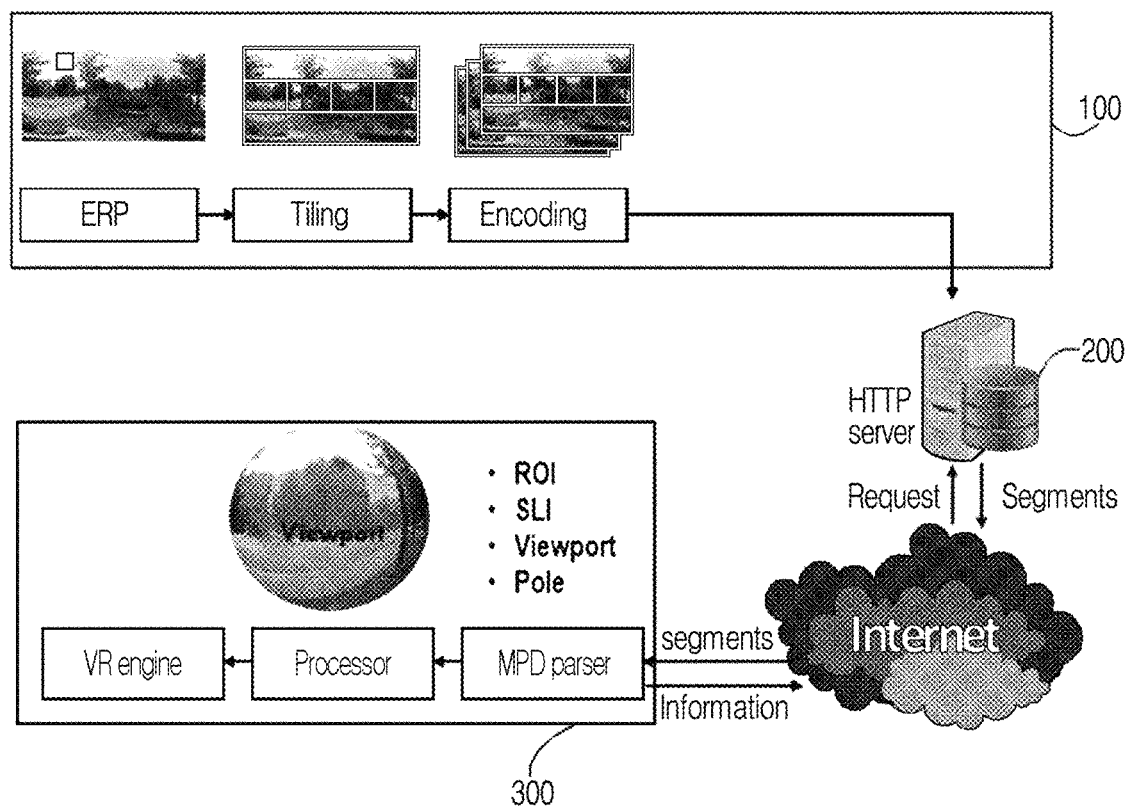
FIG. 1 is a diagram illustrating a configuration of a system for preloading a multi-view video according to an embodiment.

Hereinafter, embodiments of the present invention will be described in detail with reference to the drawings.

Advantages and features of the present invention, and methods to achieve them will be apparent from the following embodiments that will be described with reference to the accompanying drawings. It should be understood that the present invention is not limited to the following embodiments and may be embodied in different ways, and that the embodiments are given to provide complete disclosure of the invention and to provide a thorough understanding of the present invention to those skilled in the art. The scope of the present invention is defined only by the claims.

Terms used herein will now be briefly described, and embodiments of the present invention will be described in detail.

All terms including descriptive or technical terms which are used herein should be construed as having meanings that are obvious to one of ordinary skill in the art. However, the teams may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Throughout the specification, when a part "includes" an element, it is noted that it further includes other elements, but does not exclude other elements, unless specifically stated otherwise. Further, the term "unit" used in the specification means a software component or hardware component such as an FPGA or an ASIC, and performs a specific function. However, the term "unit" is not limited to software or hardware. The term "unit" may be formed so as to be in an addressable storage medium, or may be formed so as to operate one or more processors.

Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, and variables. A function provided by the components and "units" may be associated with the smaller number of components and "units", or may be divided into additional components and "units".

Hereinbelow, embodiments of the present invention will be described in detail with reference to the accompanying drawings such that the present invention can be easily embodied by those skilled in the art to which this present invention belongs. In the drawings, parts irrelevant to the description are omitted to clearly describe the present invention.

In an embodiment, in a network, Internet protocol (IP) packets, frame relay frames, asynchronous transfer mode (ATM) cells, or other types of information are transmitted between network addresses. The network may be a heterogeneous network including broadcasting networks such as cable, and satellite communication links. The network may include one or more local area networks (LAN), metropolitan area networks (MAN), wide area networks (WAN), the whole or part of a global network, such as the Internet, or any other communication system or systems in one or more locations.

In various embodiments, the heterogeneous network includes a broadcast network and a broadband network. The broadcast network is for broadcast of media data to client devices, which is generally uni-directional, for example, the direction from one or more servers to client devices. The broadcast network may include an arbitrary number of broadcast links and devices, for example, satellite, wireless, wired, and optical fiber network links and devices.

The broadband network is for broadband access to media data of client devices, which is generally bi-directional, for example, a back and forth direction between one or more servers and client devices. The broadband network may include an arbitrary number of broadband links and devices, for example, Internet, wireless, wired, and optical fiber network links and devices.

The network facilitates communication between servers and various client devices, which are playing-processing devices. Each of the servers includes any suitable computing or processing device capable of providing computing services to one or more client devices. Each of the servers may include, for example, one or more processing devices, one or more memories storing instructions and data, and one or more network interfaces facilitating communication over the network. For example, the servers may include servers that broadcast media data over the broadcast network in the network by using an HTTP technique. In another example, the servers may include servers that broadcast media data over the broadcast network in the network by using DASH.

Each client device refers to any suitable computing or processing device that interacts with at least one server or other computing device(s) over the network. In this example, examples of a play client device may include a desktop computer, a mobile phone or smartphone, a personal digital assistant (PDA), a laptop computer, a tablet computer, and a set-top box and/or television. However, any other or additional client devices may be used in the communication system.

In this example, some client devices communicate indirectly with the network. For example, the client devices communicate through one or more base stations, such as mobile-phone base stations or eNodeBs. In addition, the client devices communicate through one or more wireless access points, such as IEEE 802.11 wireless access points. Note that these are for illustration only and that each client device communicates directly with the network or indirectly with the network through any suitable intermediate device(s) or network(s). As described in more detail below, all or any one of the client devices may include a structure for receiving and providing media data by using HTTP and DASH.

Figure 2:
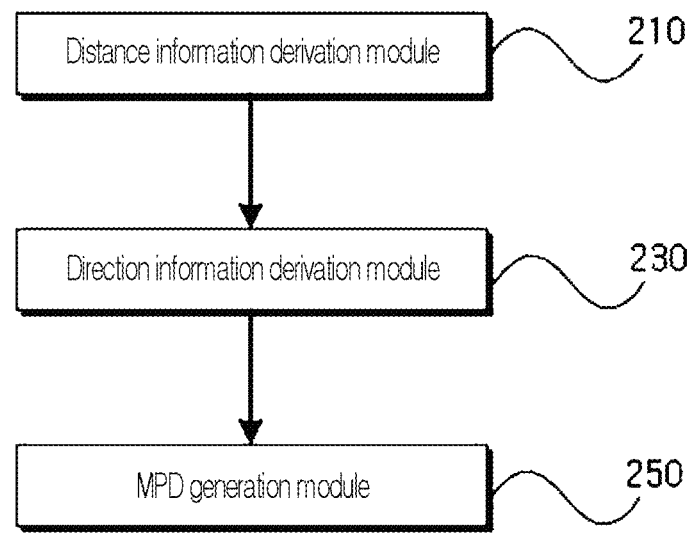
FIG. 2 is a diagram illustrating a detailed configuration of an HTTP server of the system according to an embodiment.

The communication system to which an embodiment of the present invention is applied may include any number of elements in any suitable configuration with respect to all the elements. In general, computing and communication systems are represented in a wide variety of configurations, and FIG. 2 does not limit the scope of the present invention to any particular configuration. While FIG. 2 illustrates one operational environment in which various features disclosed in this patent document can be used, these features could be used in any other suitable system.

In an embodiment, a content production unit stores information on a distance and a direction between a video of an arbitrary viewpoint and a video of the moved viewpoint, with respect to a video of content produced through multiple cameras, in a media presentation description (MPD), and transmits a result of this to an HTTP server. By using the distance information and the direction information recorded in the MPD received by the HTTP server, the video in the direction and of the viewpoint closest to the current viewpoint is allocated to a predetermined spare band for preloading, so that an available bandwidth is reduced. Accordingly, load of a system is reduced and user's Quality of Experience (QoE) is ensured.

Figure 3:
FIG. 3 is a diagram illustrating an example of a viewpoint video for the system according to an embodiment.
Figure 4:
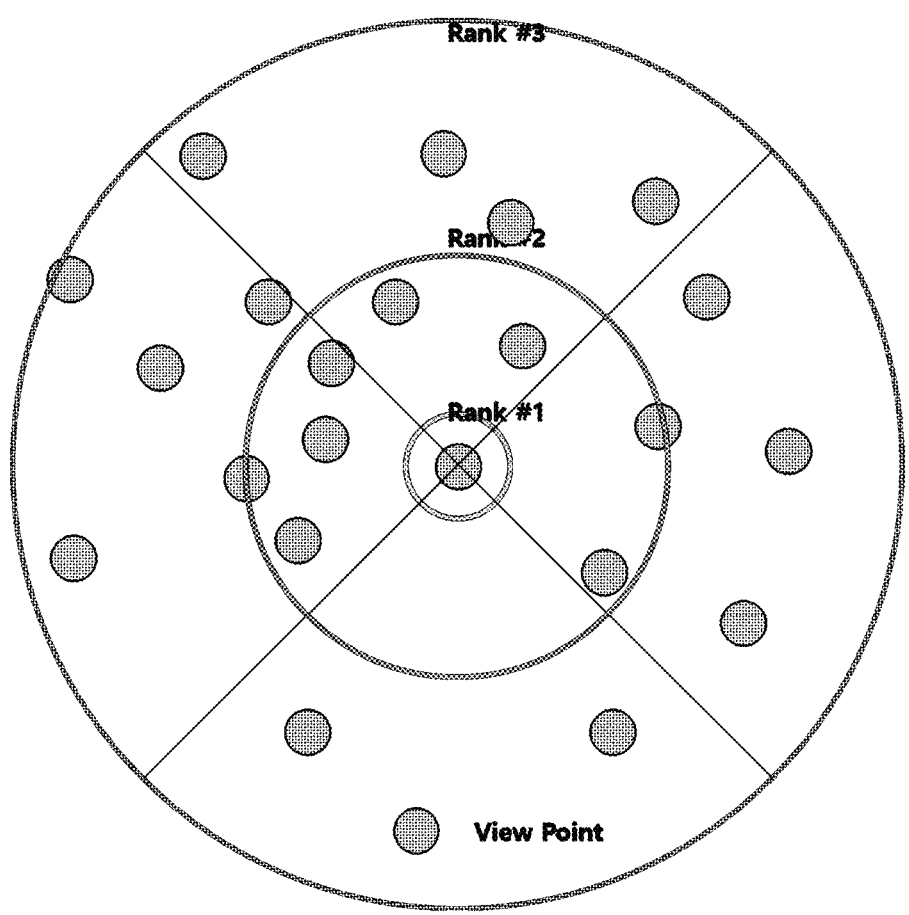
FIG. 4 is a diagram illustrating a concept of distance information of the system according to an embodiment.

FIG. 1 is a diagram illustrating a configuration of a system for preloading a multi-view video according to an embodiment of the present invention. FIG. 2 is a diagram illustrating a detailed configuration of an HTTP server 200 shown in FIG. 1. FIG. 3 is a diagram illustrating an example of a viewpoint video for a distance information derivation module 210 shown in FIG. 2. FIG. 4 is a diagram illustrating a concept of generating distance information for each viewpoint moved around an arbitrary viewpoint position shown in FIG. 3. FIG. 5 is a diagram illustrating an example of an MPD structure of an MPD generation module 230 shown in FIG. 2.

Referring to FIGS. 1 to 5, a system for preloading a multi-view video according to an embodiment may include a content production unit 100, an HTTP server 200, and a client device 300.

For partial bit rate allocation with respect to the acquired 360-degree video, the content production unit 100 may divide one panorama video in the form of equirectangular projection (ERP) into six videos (two poles and four equators) and may code the six videos for each resolution. Herein, one frame of the video is spatially divided into multiple tiles and encoded for each tile.

In addition, the content production unit 100 specifies azimuths of the x, y, and z axes and altitude angles of x, y, and z axes, for the user orientation with respect to a sound source in a 360-degree space, and then measures a head-related transfer function (HRTF) at the point corresponding to the original sound, and performs interpolation on a sound image at the point where the HRTF is not measured, thereby performing sound localization with respect to the user orientation.

The HTTP server 200 divides the media data received by the HTTP server into predetermined-time-based segments, generates an MPD, and transmits the generated MPD and a segment tile to the client device 300 through a network reference bandwidth.

The HTTP server 200 may include at least one among a distance information derivation module 210, a direction information derivation module 230, and an MPD generation module 250 as shown in FIG. 2.

The distance information derivation module 210 derives, with respect to the acquired 360-degree video, information (also referred to as distance information) on a distance between a video of an arbitrary viewpoint and a video of the same viewpoint, on the basis of the position of the arbitrary viewpoint.

Herein, regarding the position of the arbitrary viewpoint, as shown in FIG. 3, in the video in which the user views an arbitrary viewpoint, the position in which the video in a particular direction is viewed for five seconds or more is determined as a viewpoint including a region of interesting (ROI) of the user.

That is, the distance information derivation module 210 represents the viewpoint of a video the same as the video of the current viewpoint on the basis of the position of the video of the current viewpoint; generates at least one group of viewpoints belonging to a predetermined range in which the difference between the position of the video of the represented viewpoint and the position of the video of the current viewpoint is predetermined; and performs sequencing on the generated groups of viewpoints according to the degree of proximity to the position of the video of the current viewpoint.

For example, as shown in FIG. 4, sequencing is performed in the following manner: the current viewpoint belong to a first circumference determined around the current viewpoint is set as RANK 1; a group of viewpoints belonging to a predetermined range designated as a second circumference larger than the first circumference is set as RANK 2; and a group of viewpoints belonging to a predetermined range between the second circumference and a third circumference having a diameter longer than that of the second circumference is set as RANK 3. Accordingly, the distance information derivation module 210 do arrangement in order of decreasing distance between the current viewpoint and the viewpoint to move around the position of the arbitrarily designated current viewpoint.

Accordingly, the distance information derivation module 210 derives information on a distance to the positions of the viewpoints in a group belonging to a predetermined range around the position of the video of the current viewpoint, and the derived distance information is represented by one of RANK 1 to RANK N. Herein, N is a positive integer.

The direction information derivation module 230 derives, in the form of a vector, information (also referred to as direction information) on a direction for each viewpoint belonging to each RANK on the basis of the current viewpoint. That is, the direction information represents, in the form of a vector, information on a direction for each of the viewpoints in a group belonging to RANK1 on the basis of the current viewpoint.

The distance information and the direction information of each viewpoint which are derived on the basis of each viewpoint are transmitted to the MPD generation module 250.

The MPD generation module 250 generates an MPD including an audio MPD and a video MPD for an audio and a video stream, respectively, of a frame within one period. That is, the MPD includes the audio MPD and the video MPD for the audio and the video stream, respectively, of a frame within one period. Each MPD of the video and the audio include an adaptation set and a description set included in the adaptation set. In SupplymentalProperty information, SchemeID is determined to 6dof:2019, and the distance information and the direction information are included in the lower level.

For example, in the MPD structure, <supplementalProperty SchemeIdUri="Urn:mpeg:dash:6dof:2019" Rank="2" Vector="0.3, 0.9"> is added as shown in FIG. 5.

The encoded video in divided into second-based segments, and a result of this and the generated MPD are transmitted to the client device 300.

That is, the HTTP server 200 stores the video divided into segments and the MPD including each MPD of the video and the audio, and then transmits the same to the client device 300 over the network.

In this embodiment, the HTTP defines a new framework for transmitting time-series multimedia, for example, an audio, a video, and other fixed content, such as a widget, a file, etc. The DASH is an adaptive bit rate streaming technique that enables streaming of media data received from HTTP servers over the Internet, to a reception entity.

In the meantime, the client device 300 transmits a Uniform Resource Locator (URL) received over the network and requests (for example, "GET" requests) to the HTTP server 200, and receives media data of segments received in response.

Further, the client device 300 may include an MPD parser 310, a processor 320, and a VR engine 330 as shown in FIG. 1.

The MPD parser 310 transmits the Uniform Resource Locator (URL) received over the network and the requests (for example, requests *?**?*GET*?**?*) to the HTTP server 200, and receives the media data of segments received in response. The received media data is transmitted to the processor 320.

The processor 320 receives the MPD and the segments, divides the received segments into second-based segments, and predicts the position of the viewpoint of the user on the basis of the MPD.

The processor 320 determines, from the distance information and the direction information in the MPD for the predicted viewpoint of the user, whether the video of the predicted viewpoint of the user is the same as the video of a first viewpoint in which the size of the vector of the direction information is the smallest among the viewpoints in the group belonging to RANK 1. Herein, whether the videos are the same may be determined on the basis of position relationship information when information on a position relationship between each of the videos of viewpoints is recorded in the MPD. When the information on the position relationship between each of the videos of viewpoints is not recorded in the MPD, matching of feature points between two videos, and of sizes are performed and then whether the videos are the same is determined on the basis of the similarity derived through SSIM.

Next, when the similarity between the videos is high as a result of the determination, the processor 320 transmits, to the HTTP server 200, a request for the segment of the video of the viewpoint in which the size of the vector of the direction information is the smallest among the viewpoints in the group belonging to RANK 1. The HTTP server 200 transmits a response to the request for the segment which is from the processor 320, to the processor 320 of the client device 300 through the remaining band.

Afterward, the client 300 preloads the video of a second viewpoint in which the size of the vector of the direction information is the smallest among the viewpoints in the group belonging to RANK 1 except the first viewpoint, through the remaining band. This series of processes is repeated until all the viewpoints in the groups belonging to RANK 1 to RANK N are finished.

The HTTP server 200 transmits the requested segment tile to the processor 320 of the client device 300 over the network. The processor 320 processes the received segment, and transmits the processed segments to the VR engine 330. The VR engine 330 renders the video and the audio of the segments processed by the processor 320, into a 360-degree space for playing.

That is, the VR engine 330 receives the segment and uses suitable decoders for decoding, and renders a result of decoding as media data, which can be displayed on a display, for playing. In non-limiting examples, time and position of private advertisement information synchronized with the display of related media are overlaid, and/or it is possible to provide picture-in-picture (PIP) data of streamed broadband media content positioned at a time synchronized with a corner of the display and a portion associated with the displayed broadcasted media data.

In an embodiment, the information on the distance and the direction between the viewpoints in the video of the current viewpoint, which is an arbitrary viewpoint of the content acquired through the multiple cameras, and the video similar thereto, are recorded in the MPD for transmission. By using the distance information and the direction information in the received MPD, movement distance and direction of the viewpoint in the video similar to the video of the current viewpoint are derived. The videos are preloaded to the remaining band in order of proximity of movement distance and direction on the basis of the position of the current viewpoint, so that load of a system for the content having 3DoF or more is reduced. Accordingly, the client's Quality of Experience (QoE) is maximized.

According to the embodiment, the sense of direction, distance, and space for virtual reality are felt in the same manner as those for the real environment, so that a virtual reality service is provided realistically, thereby further improving immersion and interest in the virtual reality service.

Figure 6:
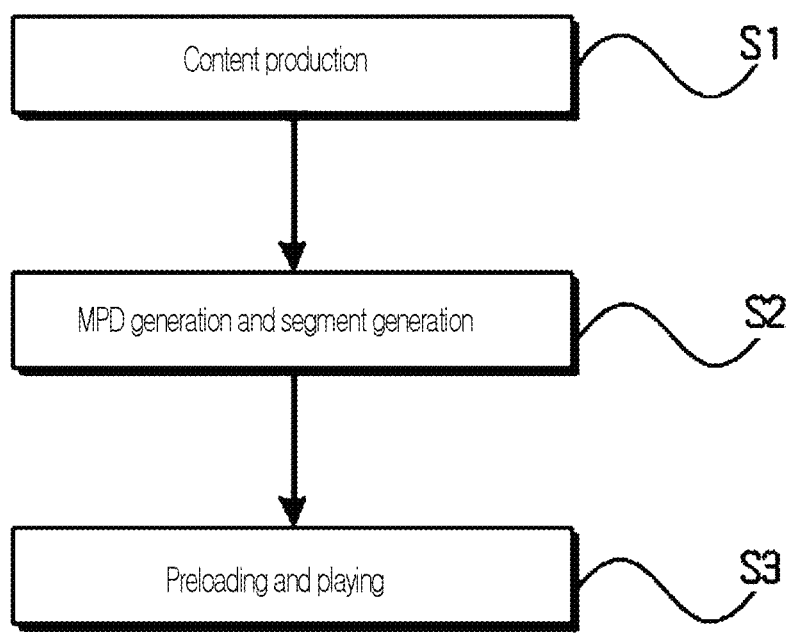
FIG. 6 is a flowchart illustrating a process of preloading a multi-view video according to an embodiment.

FIG. 6 is a flowchart illustrating an overall process of preloading a multi-view video according to another embodiment. Referring to FIG. 6, at step S1, the HTTP server 200 of the embodiment receives the media data in which a video in the form of ERP acquired through multiple cameras is spatially divided and encoded, and the HTTP server 200 divides the media data into predetermined-time-based segments.

Next, at step S2, the HTTP server 200 of the embodiment generates an MPD for each of the segments resulting from the division; adds, to the generated MPD, the information on the distance and the direction between the viewpoints in the video of the current viewpoint and the video similar thereto; and transmits a resulting MPD and a segment tile to the client device 300 over a reference bandwidth of the network.

Herein, at step S2, the HTTP server 200 of the embodiment may derive the information on the distance between the positions of the viewpoints in the video of the current viewpoint and the videos similar thereto, on the basis of the position of the video of the current viewpoint; may derive, in the form of a vector, the direction information for each viewpoint belonging to each RANK, on the basis of the current viewpoint; and may generate a MPD by adding, into the MPD including the audio MPD and the video MPD for the audio and the video stream, respectively, of a frame within one period, the distance information and the direction information of the viewpoint for a region of interesting (ROI) within the frame.

That is, regarding the distance information of the HTTP server 200, RANK 1 to RANK N for respective groups of viewpoints belonging to at least one predetermined range in which the difference in the positions of the viewpoints between the video of the current viewpoint and each of the videos similar thereto is predetermined, are derived on the basis of the position of the video of the current viewpoint. One piece of distance information RANK 1 to RANK N may be allocated to the group of the viewpoints belonging to the one predetermined range.

In addition, the HTTP server 200 of the embodiment includes the adaptation set and the description set included in the adaptation set; and determines, in the Supplemental-Property information, the SchemeID as 6dof:2019 and records the distance information and the direction information in the lower level.

In the meantime, at step S3, the client device 300 of the embodiment receives segments and the MPD for each segment from the HTTP server 200; parses the MPD; divides the received segments into second-based segments; and predicts the position of the viewpoint of the user on the basis of the MPD. Next, from the distance information and the direction information in the MPD for the segment of the predicted viewpoint of the user, preloading is performed in order, starting from the video of the viewpoint in which the size of the vector of the direction information is the smallest among the viewpoints in the group corresponding to the information on the minimum distance.

Herein, from the distance information and the direction information in the MPD for the predicted viewpoint of the user, the client device 300 determines whether the video of the predicted viewpoint of the user is the same as the video of the viewpoint in which the size of the vector of the direction information is the smallest among the viewpoints in the group corresponding to the information on the minimum distance. When the similarity between the videos is high as a result of the determination, the client device 300 transmits, to the HTTP server 200, a request for the segment of the video of the viewpoint in which the size of the vector of the direction information is the smallest among the viewpoints in the group belonging to RANK 1. The client device 300 preloads a response to the request for the segment, to the remaining band, and then plays.

The information on the distance and the direction between the viewpoints in the video of the current viewpoint, which is an arbitrary viewpoint of the content acquired through the multiple cameras, and the video similar thereto, are recorded in the MPD for transmission. By using the distance information and the direction information in the received MPD, movement distance and direction of the viewpoint in the video similar to the video of the current viewpoint are derived. The videos are preloaded to the remaining band in order of proximity of movement distance and direction on the basis of the position of the current viewpoint, so that load of a system for the content having 3DoF or more is reduced. Accordingly, the client's Quality of Experience (QoE) is maximized.

According to the embodiment, the sense of direction, distance, and space for virtual reality are felt in the same manner as those for the real environment, so that a virtual reality service is provided realistically, thereby further improving immersion and interest in the virtual reality service.

As described above, although the present invention has been described with limited embodiments and the drawings, those skilled in the art will appreciate that the present invention can be embodied in many alternate forms. For example, suitable results may be achieved if the described techniques are performed in a different order and/or if components in a described system, architecture, device, or circuit are combined in a different manner and/or replaced or supplemented by other components or their equivalents. Therefore, the scope of the present invention shall not be limited to the above-described embodiments, and should be determined by the appended claims as well as equivalents thereto.

What is claimed is:

1. A system for preloading a multi-view video, the system comprising:
a content production unit generating media data in which the video in a form of equirectangular projection (ERP) acquired through multiple cameras is spatially divided and encoded; and
an HTTP server receiving the media data; dividing the media data into predetermined-time-based segments; generating a media presentation description (MPD) for each of the segments resulting from the division; adding, to the generated MPD, distance information and direction information, the distance being a difference in positions of viewpoints between the video of a current viewpoint and the video similar thereto; and transmitting a resulting MPD and a segment tile to a client device over a network, wherein the direction information in the MPD represents, in the form of a vector, information on a direction for each of the viewpoints with respect to the current viewpoint.

2. The system of claim 1, wherein the HTTP server
derives the distance information on the basis of the position of the video of the current viewpoint, the distance being between the positions of the viewpoints in the video of the current viewpoint and the videos similar thereto;
derives, in a form of a vector, movement direction information of the viewpoints in the video of the current viewpoint and the videos similar thereto, on the basis of the position of the current viewpoint; and
adds, into the MPD for each of an audio and a video stream of a frame within one period, the distance information and the movement direction information of the viewpoint for a region of interesting (ROI) of a user within the frame.

3. The system of claim 2, wherein the HTTP server is configured to
derive, on the basis of the position of the video of the current viewpoint, the difference in the positions of the viewpoints between the video of the current viewpoint and the videos similar thereto, and
provide the distance information for respective groups of the viewpoints belonging to at least one predetermined range in which the derived difference between the position of the viewpoint of each of the videos similar to the video of the current viewpoint and the position of the current viewpoint is predetermined.

4. The system of claim 3, wherein the distance information is configured so that one piece of the distance information is provided to the group of the viewpoints belonging to the one predetermined range.

5. The system of claim 4, wherein the HTTP server includes an adaptation set and a description set included in the adaptation set, determines, in SupplymentalProperty information, a SchemeID property as 6dof:2019, and records the distance information and the direction information in a lower level.

6. A system for preloading a multi-view video, the system comprising:
a client device receiving segments and a media presentation description (MPD) for each of the segments from an HTTP server; parsing the MPD; dividing the received segments into time-based segments; and predicting a position of a viewpoint of a user on the basis of the MPD,
wherein the client device is configured to perform, from distance information and movement direction information in the MPD for the segment of the predicted viewpoint of the user, preloading for playing in order, starting from the video of the viewpoint in which a size of a vector of the movement direction information is the smallest among the viewpoints indicated in the distance information to be in a group corresponding to the highest, with respect to other groups, degree of proximity to a current viewpoint.

7. The system of claim 6, wherein the client device comprises:
an MPD parser receiving the segments and the MPD for each of the segments from the HTTP server; parsing the MPD; and predicting the position of the viewpoint of the user on the basis of the MPD;
a processor determining, from the distance information and the movement direction information in the MPD for the predicted viewpoint of the user, whether the video of the predicted viewpoint of the user is the same as the video of the viewpoint in which the size of the vector of the movement direction information is the smallest among the viewpoints in the group corresponding to the highest degree of proximity to the current viewpoint; and transmitting, to the HTTP server when similarity between the videos is high as a result of the determination, a request for the segment of the video of the viewpoint in which the size of the vector of the movement direction information is the smallest among the viewpoints in the group corresponding to the distance information; and
a virtual reality (VR) engine preloading a response to the request for the segment which is from the HTTP server, to a remaining band and then performing playing.

8. A method for preloading a multi-view video, the method comprising:
(a) receiving, by an HTTP server, media data in which the video in a form of equirectangular projection (ERP) acquired through multiple cameras is spatially divided and encoded, and dividing the media data into predetermined-time-based segments; and
(b) generating a media presentation description (MPD) for each of the segments resulting from the division; adding, to the generated MPD, distance information and direction information, the distance being between viewpoints in the video of a current viewpoint and the video similar thereto; and transmitting a resulting MPD and a segment tile to a client device over a network, wherein the direction information in the MPD represents, in the form of a vector, information on a direction for each of the viewpoints with respect to the current viewpoint.

9. The method of claim 8, wherein the step (a) comprises:
deriving, at a distance information derivation step, the distance information on the basis of a position of the video of the current viewpoint, the distance being a difference in the positions of the viewpoints between the video of the current viewpoint and the videos similar thereto;

deriving, in a form of a vector at a direction information derivation step, movement direction information of the viewpoints in the video of the current viewpoint and the videos similar thereto, on the basis of the position of the current viewpoint; and adding, at an MPD generation step, into the MPD for each of an audio and a video stream of a frame within one period, the distance information and the movement direction information of the viewpoint for a region of interesting (ROI) of a user within the frame.

10. The method of claim 9, wherein the distance information derivation step comprises:

deriving, on the basis of the position of the video of the current viewpoint, the difference in the positions of the viewpoints between the video of the current viewpoint and the videos similar thereto; and providing the distance information for respective groups of the viewpoints belonging to at least one predetermined range in which the derived difference between the position of the viewpoint of each of the videos similar to the video of the current viewpoint and the position of the current viewpoint is predetermined.

11. The method of claim 10, wherein the distance information is configured so that one piece of the distance information is provided to the group of the viewpoints belonging to the one predetermined range.

12. The method of claim 11, wherein at the MPD generation step, an adaptation set and a description set included in the adaptation set are included; in SupplymentalProperty information, a SchemeID property is determined as 6dof: 2019; and the distance information and the direction information are recorded in a lower level.

13. A method for preloading a multi-view video, the method comprising:

(c) receiving segments and a media presentation description (MPD) for each of the segments from an HTTP server; and parsing the MPD;

(d) dividing the received segments into time-based segments;

and predicting a position of a viewpoint of a user on the basis of the MPD; and (e) performing, from distance information and movement direction information in the MPD for the segment of the predicted viewpoint of the user, preloading for playing in order, starting from the video of the viewpoint in which a size of a vector of the movement direction information is the smallest among the viewpoints indicated in the distance information to be in a group corresponding to the highest, with respect to other groups, degree of proximity to a current viewpoint.

14. The method of claim 13, wherein the step (e) comprises:

receiving the segments and the MPD for each of the segments from the HTTP server, parsing the MPD, and predicting the position of the viewpoint of the user on the basis of the MPD;

determining, from the distance information and the movement direction information in the MPD for the predicted viewpoint of the user, whether the video of the predicted viewpoint of the user is the same as the video of the viewpoint in which the size of the vector of the movement direction information is the smallest among the viewpoints in the group corresponding to the highest degree of proximity to the current viewpoint;

transmitting, to the HTTP server, when similarity between the videos is high as a result of the determination, a request for the segment of the video of the viewpoint in which the size of the vector of the movement direction information is the smallest among the viewpoints in the group corresponding to the distance information; and preloading a response to the request for the segment which is from the HTTP server, to a remaining band, and performing playing.

15. A method for preloading a multi-view video, the method comprising:

(a) receiving, by an HTTP server, media data in which the video in a form of equirectangular projection (ERP) acquired through multiple cameras is spatially divided and encoded, and dividing the media data into predetermined-time-based segments;

(b) generating a media presentation description (MPD) for each of the segments resulting from the division; adding, to the generated MPD, distance information and direction information, the distance being between viewpoints in the video of a current viewpoint and the video similar thereto; and transmitting a resulting MPD and a segment tile to a client device over a network; and (c) receiving, by a client device, the segments and the MPD for each of the segments from the HTTP server; parsing the MPD; dividing the received segments into time-based segments; predicting a position of the viewpoint of a user on the basis of the MPD; and performing, from the distance information and movement direction information in the MPD for the segment of the predicted viewpoint of the user, preloading for playing in order, starting from the video of the viewpoint in which a size of a vector of the direction information is the smallest among the viewpoints indicated in the distance information to be in a group corresponding to the highest, with respect to other groups, degree of proximity to a current viewpoint.

16. The system of claim 1, wherein the HTTP server generates one or more groups of viewpoints with each of the one or more groups corresponding to a predetermined range of distances between the current viewpoint and viewpoints in the group, the distance information for the segments is represented in the MPD as an indication of which of the one or more groups includes the respective segments, and the client device preloads the segments for playing in a sequence based on a degree of proximity represented by each group by starting from a viewpoint in which a size of the vector of the direction information is the smallest among the viewpoints indicated in the distance information to be in a group corresponding to the highest, with respect to other groups, degree of proximity to a current viewpoint.

* * * * *